(12) United States Patent
Carlsson et al.

(10) Patent No.: US 6,890,015 B2
(45) Date of Patent: May 10, 2005

(54) LOADING COMPARTMENT

(75) Inventors: Anders Carlsson, Hisings Backa (SE); Tomas Wiberg, Torslanda (SE); Ricardo Heras Paleo, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/882,692

(22) Filed: Jun. 15, 2001

(65) Prior Publication Data
US 2002/0070574 A1 Jun. 13, 2002

Related U.S. Application Data

(63) Continuation of application No. PCT/SE99/02403, filed on Dec. 17, 1999.

(30) Foreign Application Priority Data
Dec. 17, 1998 (SE) ................................. 9804389

(51) Int. Cl.⁷ ................................. B60R 7/04
(52) U.S. Cl. ................................. 296/37.14
(58) Field of Search ................. 296/37.1, 37.2, 296/37.3, 37.5, 37.6, 37.8, 37.14, 37.15, 37.16, 24.3, 24.1

(56) References Cited

U.S. PATENT DOCUMENTS

| 5,080,417 A | * | 1/1992 | Kanai ...................... 296/37.14 |
| 5,257,846 A | * | 11/1993 | Kanai et al. .............. 296/37.14 |
| 5,636,890 A | | 6/1997 | Cooper ...................... 296/37.1 |
| 5,842,730 A | * | 12/1998 | Schneider et al. ........ 296/37.16 |
| 6,033,003 A | * | 3/2000 | Bell et al. .................. 296/37.3 |
| 6,253,943 B1 | * | 7/2001 | Spykerman et al. ........ 224/542 |
| 6,375,055 B1 | * | 4/2002 | Spykerman et al. ........ 224/542 |
| 2002/0095947 A1 | * | 7/2002 | Treppedi et al. ........... 62/457.9 |

FOREIGN PATENT DOCUMENTS

| CA | 2137634 | 9/1998 | ............. B60R/7/02 |
| DE | 33 32 695 A1 | 3/1985 | ............. B60R/5/00 |
| DE | 43 40 675 A1 | 6/1995 | ............. B60R/7/02 |
| DE | 198 02 077 A1 | 8/1998 | ............. B60R/5/00 |
| JP | 404191138 A | * 7/1992 | ............. 296/37.14 |
| WO | WO 95/01891 | 1/1995 | ............. B60R/5/00 |

OTHER PUBLICATIONS

International Search Report for Application No. PCT/SE99/02403 dated Apr. 20, 2000 (mailing date).
Preliminary Examination Report for Application No. PCT/SE99/02403, dated Mar. 19, 2001 (report completion date).

* cited by examiner

Primary Examiner—D. Glenn Dayoan
Assistant Examiner—Lori L. Coletta
(74) Attorney, Agent, or Firm—Novak Druce LLP

(57) ABSTRACT

A loading compartment in a vehicle having a recess in the floor of the vehicle and a cover. The cover covers the recess in a closed position and allows access to a storage space defined by the recess in an open position. The cover is mounted to the floor of the vehicle. A load-receiving element having the shape of the recess is detachably disposed in the recess. The load-receiving element has load-receiving surfaces for supporting goods place on the load-receiving element. The cover also includes at least one supporting member to secure goods in the storage space.

30 Claims, 2 Drawing Sheets

LOADING COMPARTMENT

CROSS REFERENCE TO RELATED APPLICATIONS

The present invention is a continuation of PCT Application No. PCT/SE99/02403 filed Dec. 17, 1999, which claims priority to Swedish Application No. 9804389-6, filed Dec. 17, 1998.

BACKGROUND OF THE INVENTION

1. Technical Field

The present invention relates to a loading compartment in a vehicle. Specifically, the present invention relates to a recess in the cargo space of a vehicle for storing goods with a removable cover for covering the recess as well as securing goods placed in the recess.

2. Background Information

In the transportation of goods, such as bags of food and cardboard boxes, a vehicle is often used. Typically, the goods are placed in the cargo space of the vehicle. The cargo space can be separate from the passenger compartment of the vehicle, for example, in a sedan, or can be part of the passenger compartment, for example, in a station wagon, hatchback or sports utility vehicle.

Typically, in modern vehicles, the floor of the cargo space includes a recess which defines a storage space for storing items, such as a spare tire, a battery, or a jack. A cover pivotally mounted to the floor covers the recess. In the closed position, e.g., when cover covers the recess, the cover is part of the floor of the vehicle on which goods can be placed on top of the cover. However, when goods are placed on the floor of the cargo space, the goods have a tendency to tip over and/or move while the vehicle is moving. As a result, either the goods are damaged or the furnishings of the vehicle are damaged by the goods.

An object of the present invention is to provide a loading compartment in a vehicle that secures goods in the vehicle and prevents the goods from tipping over and/or moving. The loading compartment of the present invention accomplishes this by including at least one supporting member disposed on the cover for securing goods placed in a storage space of the loading compartment. In addition, the loading compartment can include a load-receiving element matched to the shape of the recess. The loading receiving element is detachably attached in the recess, with the load-receiving element having load-receiving surfaces for securing goods placed on the load-receiving element. Specifically, the load-receiving surfaces of the load-receiving element and the supporting member attached to the cover secure the goods, thereby preventing the goods from tipping over and/or moving.

Other features and advantages of the invention will become apparent from the following description of a preferred embodiment.

BRIEF DESCRIPTION OF THE DRAWINGS

The invention will be described below on the basis of an illustrative embodiment and with reference to the attached drawings, in which.

DETAILED DESCRIPTION OF THE INVENTION

Figure 1:
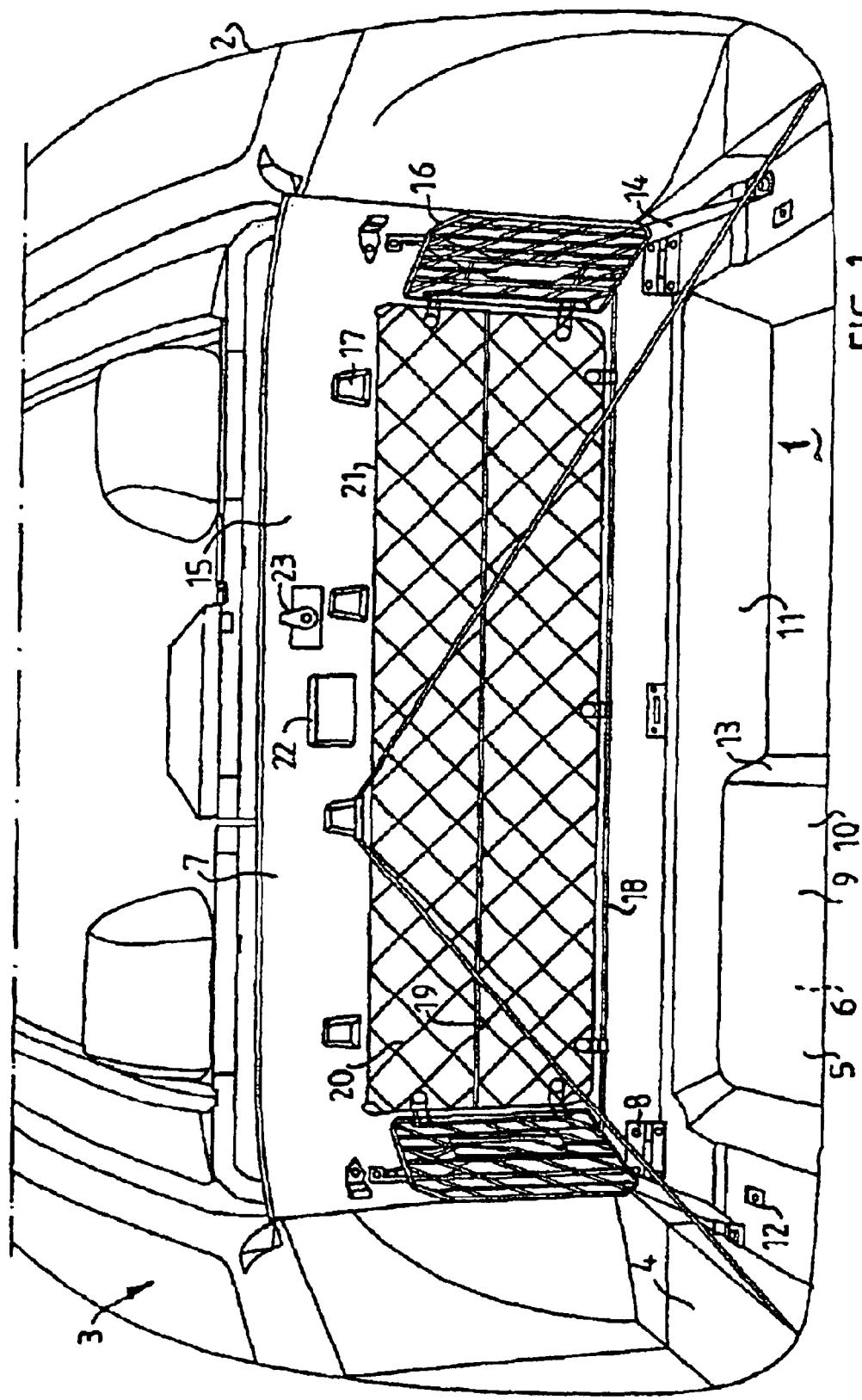
FIG. 1 shows a perspective view of a loading compartment in a vehicle seen from the rear of a vehicle in accordance with an embodiment of the present invention.
Figure 2:
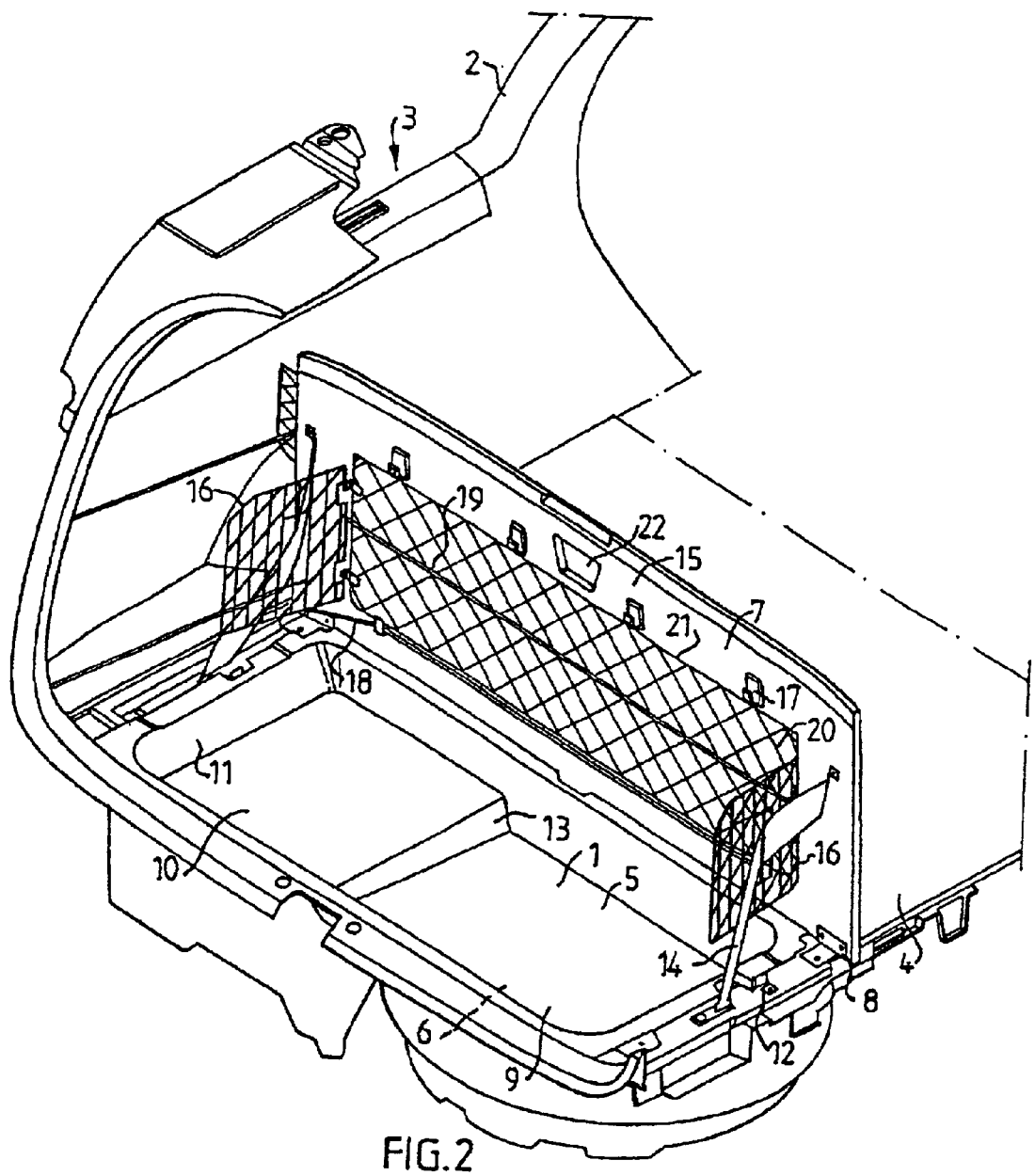
FIG. 2 shows a top perspective view of the loading compartment illustrated in FIG. 1 in accordance with an embodiment of the present invention.

Referring to FIG. 1, a loading compartment 1 in a vehicle 2 is illustrated in a view seen from the rear of the vehicle 2 in accordance with an embodiment of the present invention. As shown, the exemplary vehicle 2 is a station wagon with the rear hatch or the rear door to the cargo space 3 of the vehicle 2 is open. In FIG. 2, the loading compartment 1 according to FIG. 1 is shown in a different perspective. The floor 4 of the cargo space 3 is provided with a recess 5, which defines a storage space 6 for storing items (not shown) such as a spare wheel, a battery, or a jack.

A cover 7 is pivotally mounted to the floor 4 by means of hinges 8. In FIG. 1, the cover 7 is raised in an open position, thereby allowing access to the storage space 6. In a closed position, the cover 7 essentially covers the recess 5 so that the cover 7 coincides with the plane of the floor 4.

A load-receiving element 9 is disposed in the recess 5. The load-receiving element 9 is removable thereby allowing access to the storage space 6. Preferably, the load-receiving element 9 is shaped as a casing and includes load-receiving surfaces having a bottom surface 10 and side surfaces 11 for securing goods (not shown) placed on the load-receiving element 9. The load-receiving element 9 is preferably made of an injection-molded plastic, but other materials are also conceivable. The bottom surface 10 is patterned to further secure goods placed thereon, thereby preventing goods from sliding and moving in the loading compartment 1. The load-receiving element 9 is preferably detachably connected to the floor 4 by means of fastening devices 12, such as clips or screws. In FIG. 1, the bottom surface 10 is provided with a step 13, thereby providing two levels of the bottom surface 10. This allows adaptation to goods of different sizes. It is nevertheless conceivable for the bottom surface 10 just to have one level. The shape of the load-receiving element 9 is preferably matched to the recess 5.

The cover 7 is pivotally connected to a front edge of the recess 5 in relation to the vehicle 2 with at least one load-receiving belt 14 attached to the cover 7 and the floor 4. Preferably, load-receiving belts are used on each side of the cover 7. The load-receiving belt 14, together with the cover 7, prevents goods from moving in the vehicle 2. On the cover underside 15, i.e., the side of the cover 7 which when the cover 7 is closed faces the recess 5, there are disposed first and second supporting members 16, 17. The first supporting members comprise supporting flaps 16 pivotally mounted on the cover 7. The supporting flaps 16 are spring-tensioned so that, in the closed position of the cover 7, they are folded in and bear against the cover 7 and, in the open position of the cover 7, they are folded out and extend essentially at right-angles to the cover 7. Since the supporting flaps are spring tensioned, the supporting flaps 16 and the load-receiving belts 14 automatically fold out from the cover 7 when the cover 7 is moved to the open position. The second supporting members 17 comprise fastening members 17 attached to the cover 7 for suspension of goods. According to that embodiment illustrated, the fastening members 17 include a plurality of hooks attached on the cover underside 15. An elastic cord 18 is disposed in the loading compartment 1. The elastic cord 18 can be fastened to the fastening members 17 for securing goods placed on the load-receiving element 9. An elastic strap 19 is clamped to the underside 15 of the cover 7. The elastic strap 19 can be placed around the goods. On the underside 15 of the cover 7 there is also a net 20, in which the goods can be placed. The net 20 forms a pocket, which is spring-loaded with the aid of an elastic band 21.

The cover 7 is provided with a handle 22 that can be gripped in order to raise and lower the cover 7. A locking device 23 ensures that the cover 7 is locked when in the lowered, closed position. In order to fix the cover 7 in the raised, open position, one or more leaf springs (not shown) are arranged in the region of the hinges 8. The leaf springs are configured such that the cover 7 snaps into a bent section of the leaf spring, meaning that the cover 7 assumes a fixed position. When in this raised position, the cover 7 preferably slopes rearward in relation to the vehicle 2 at an angle of about eighty-five (85) degrees between the floor 4 and the underside 15 of the cover 7. This angle of the cover 7 prevents goods from moving during travel.

In another embodiment, goods are placed in the loading compartment 1 with the load-receiving element 9 removed. The goods are placed directly in the storage space 6 formed by the recess 5. The supporting members 16, 17 assist in securing goods in the storage space 6.

In yet another embodiment, the loading compartment 1 can include only the load-receiving element 9 with the support surfaces 10, 11 assisting in securing goods placed on the load-receiving element 9.

Although the present invention has been described and illustrated in detail, it is to be clearly understood that the same is by way of illustration and example only, and is not to be taken as a limitation. The spirit and scope of the present invention are to be limited only by the terms of any claims presented hereafter.

What is claimed is:

1. A loading compartment in a floor of a vehicle comprising:
   a recess in the floor of the vehicle;
   a cover mounted in the floor for covering the recess in a closed position and for allowing access to a storage space defined by the recess in an open position; and
   at least one supporting member pivotably mounted to the cover for securing goods placed in the storage space.

2. The loading compartment according to claim 1 wherein the at least one supporting member further comprises supporting flaps attached to the cover.

3. The loading compartment according to claim 2 wherein the supporting flaps are spring-tensioned and fold in and bear against the cover when the cover is in the closed position and fold out and extend at about right-angles to the cover when the cover is in the open position.

4. The loading compartment according to claim 1 wherein the cover is attached to a front edge of the recess in relation to the vehicle and at least one belt is attached between the cover and the floor, wherein the belt and the cover secure goods placed in the storage space.

5. The loading compartment according to claim 1, further comprising a second supporting member having fastening members attachable to the cover for suspension of goods.

6. The loading compartment according to claim 5 further comprising an elastic cord disposed in the loading compartment, wherein the elastic cord is fastened to the fastening members thereby securing goods in the storage space.

7. The loading compartment according to claim 1 further comprising a load-receiving element comprising load-receiving surfaces detachable disposed in the recess.

8. The loading compartment according to claim 7 wherein the load-receiving element is shaped as a casing comprising a bottom surface and side surfaces.

9. A loading compartment in a floor of a vehicle comprising:
   a recess in the floor of the vehicle;
   a storage space defined by the recess;
   a cover pivotally connected to the floor for covering the recess in a closed position and for allowing access to the storage space in an open position;
   a load-receiving element matched to the shape of the recess, the load-receiving element detachably disposed in the recess and providing load-receiving surfaces for securing goods placed on the load-receiving element; and
   at least one load-receiving belt is attached between the cover and the floor for securing goods in the recess.

10. The loading compartment according to claim 9 wherein the load-receiving element is shaped as a casing, with the load-receiving surfaces having a bottom surface and side surfaces.

11. The loading compartment according to claim 9 comprising at least one supporting member attached to the cover for securing goods placed on the load-receiving element.

12. The loading compartment according to claim 11 wherein at least one supporting member comprises a first supporting member further comprising supporting flaps pivotally mounted on the cover.

13. The loading compartment according to claim 12 wherein the supporting flaps are spring-tensioned and fold in and bear against the cover when the cover is in a closed position and fold out and extend at about right angles to the cover when the cover is in an open position.

14. The loading compartment according to claim 9 wherein the cover is pivotally connected to a front edge of the recess in relation to the vehicle.

15. The loading compartment according to claim 11 wherein the at least one supporting member further comprises a second supporting member comprising fastening members attached to the cover for suspension of goods.

16. The loading compartment according to claim 15 further comprising an elastic cord in the loading compartment, wherein the elastic cord is fastened to the fastening members thereby securing goods placed on the load-receiving element.

17. A loading compartment in a floor of a vehicle comprising:
   a recess in the floor of the vehicle;
   a cover mounted in the floor for covering the recess in a closed position and for allowing access to a storage space defined by the recess in an open position; and
   at least one supporting member attachable to the cover for securing goods placed in the storage space, the at least one supporting member having supporting flaps attached to the cover.

18. The loading compartment according to claim 17 wherein the supporting flaps are spring-tensioned and fold in and bear against the cover when the cover is in the closed position and fold out and extend at about right-angles to the cover when the cover is in the open position.

19. A loading compartment in a floor of a vehicle comprising:
   a recess in the floor of the vehicle;
   a cover mounted in the floor for covering the recess in a closed position and for allowing access to a storage space defined by the recess in an open position; and
   at least one supporting member attachable to the cover for securing goods placed in the storage space,
   wherein the cover is attached to a front edge of the recess in relation to the vehicle and at least one belt is attached between the cover and the floor, and wherein the belt and the cover secure goods placed in the storage space.

20. A loading compartment in a floor of a vehicle comprising:

a recess in the floor of the vehicle;

a cover mounted in the floor for covering the recess in a closed position and for allowing access to a storage space defined by the recess in an open position;

at least one supporting member attachable to the cover for securing goods placed in the storage space; and a load-receiving element having load-receiving surfaces detachably disposed in the recess.

21. The loading compartment according to claim 20 wherein the load-receiving element is shaped as a casing having a bottom surface and side surfaces.

22. A loading compartment in a floor of a vehicle comprising:

a recess in the floor of the vehicle;

a storage space defined by the recess;

a cover pivotally connected to the floor for covering the recess in a closed position and for allowing access to the storage space in an open position;

a load-receiving element matched to the shape of the recess, the load-receiving element detachably disposed in the recess and providing load-receiving surfaces for securing goods placed on the load-receiving element; and at least one supporting member attachable to the cover for securing goods placed on the load-receiving element.

23. The loading compartment according to claim 22 wherein the at least one supporting member further comprises a first supporting member having supporting flaps pivotally mounted on the cover.

24. The loading compartment according to claim 23 wherein the supporting flaps are spring-tensioned and able to fold in and bear against the cover when the cover is in a closed position, and able to fold out and extend at about right angles to the cover when the cover is in an open position.

25. The loading compartment according to claim 22 wherein the at least one supporting member further comprises a second supporting member having fastening members attachable to the cover for suspension of goods.

26. The loading compartment according to claim 25, further comprising an elastic cord in the loading compartment, wherein the elastic cord is fastened to the fastening members thereby securing goods placed on the load-receiving element.

27. A loading compartment in a floor of a vehicle comprising:

a recess in the floor of the vehicle;

a storage space defined by the recess;

a cover pivotally connected to the floor for covering the recess in a closed position and for allowing access to the storage space in an open position; and a load-receiving element matched to the shape of the recess, the load-receiving element detachably disposed in the recess and providing load-receiving surfaces for securing goods placed on the load-receiving element, wherein the cover is pivotally connected to a front edge of the recess in relation to the vehicle and at least one load-receiving belt is attached between the cover and the floor for securing goods in the recess.

28. A loading compartment in a floor of a vehicle comprising:

a recess in the floor of the vehicle;

a cover mounted in the floor for covering the recess in a closed position and for allowing access to a storage space defined by the recess in an open position, the cover further comprising an elastic member having two ends, wherein both ends are attached to the cover; and at least one supporting member attached to the cover for securing goods placed in the storage space.

29. A loading compartment in a floor of a vehicle comprising:

a recess in the floor of the vehicle;

a cover mounted in the floor for covering the recess in a closed position and for allowing access to a storage space defined by the recess in an open position, the cover further comprising a net attached to the cover and in which goods can be placed; and at least one supporting member attached to the cover for securing goods placed in the storage space.

30. The loading compartment according to claim 29, further comprising an elastic band for spring-loading the net.

* * * * *